May 10, 1960 M. T. THORSSON 2,936,165
DIGITAL BALANCING HIGH SPEED SCALE SYSTEM
Filed Nov. 1, 1955 5 Sheets-Sheet 4
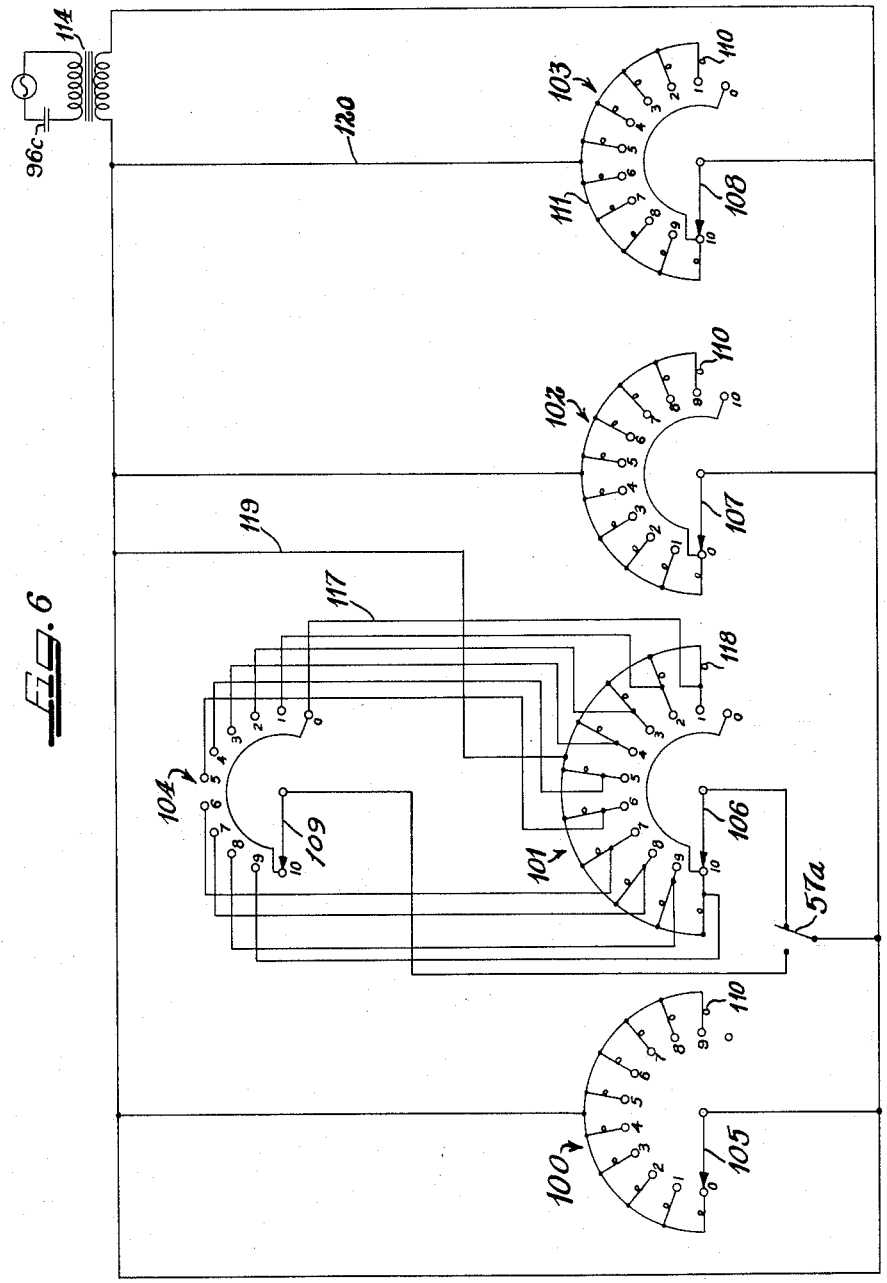
INVENTOR.
Matthew T. Thorsson May 10, 1960 M. T. THORSSON 2,936,165
DIGITAL BALANCING HIGH SPEED SCALE SYSTEM
Filed Nov. 1, 1955 5 Sheets-Sheet 5
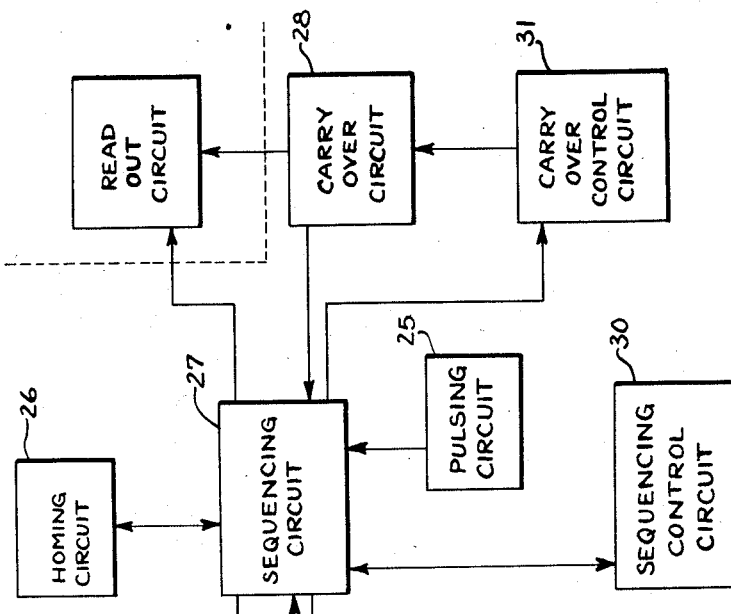
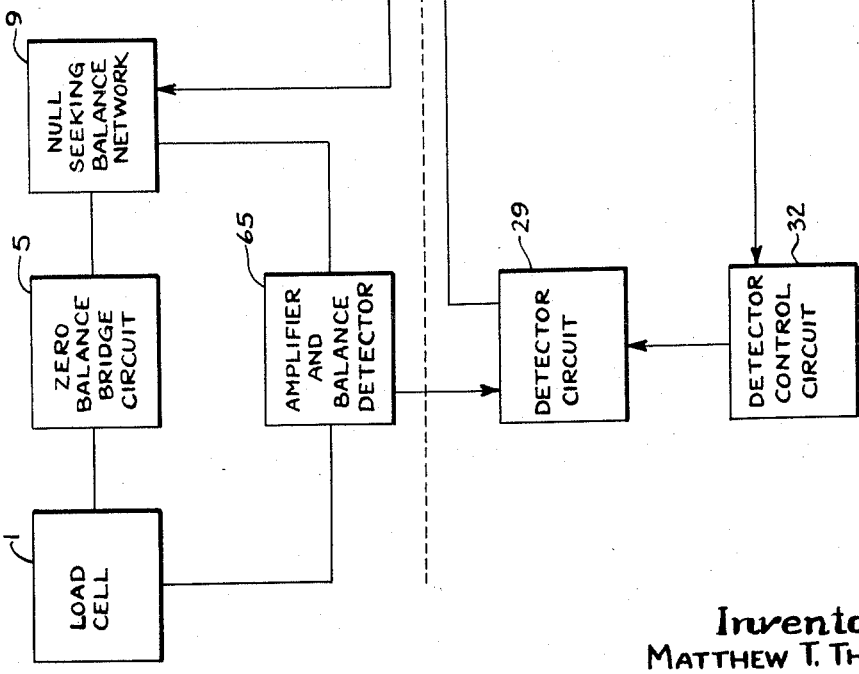
Fig.7
Inventor
MATTHEW T. THORSSON
by:
Atty.

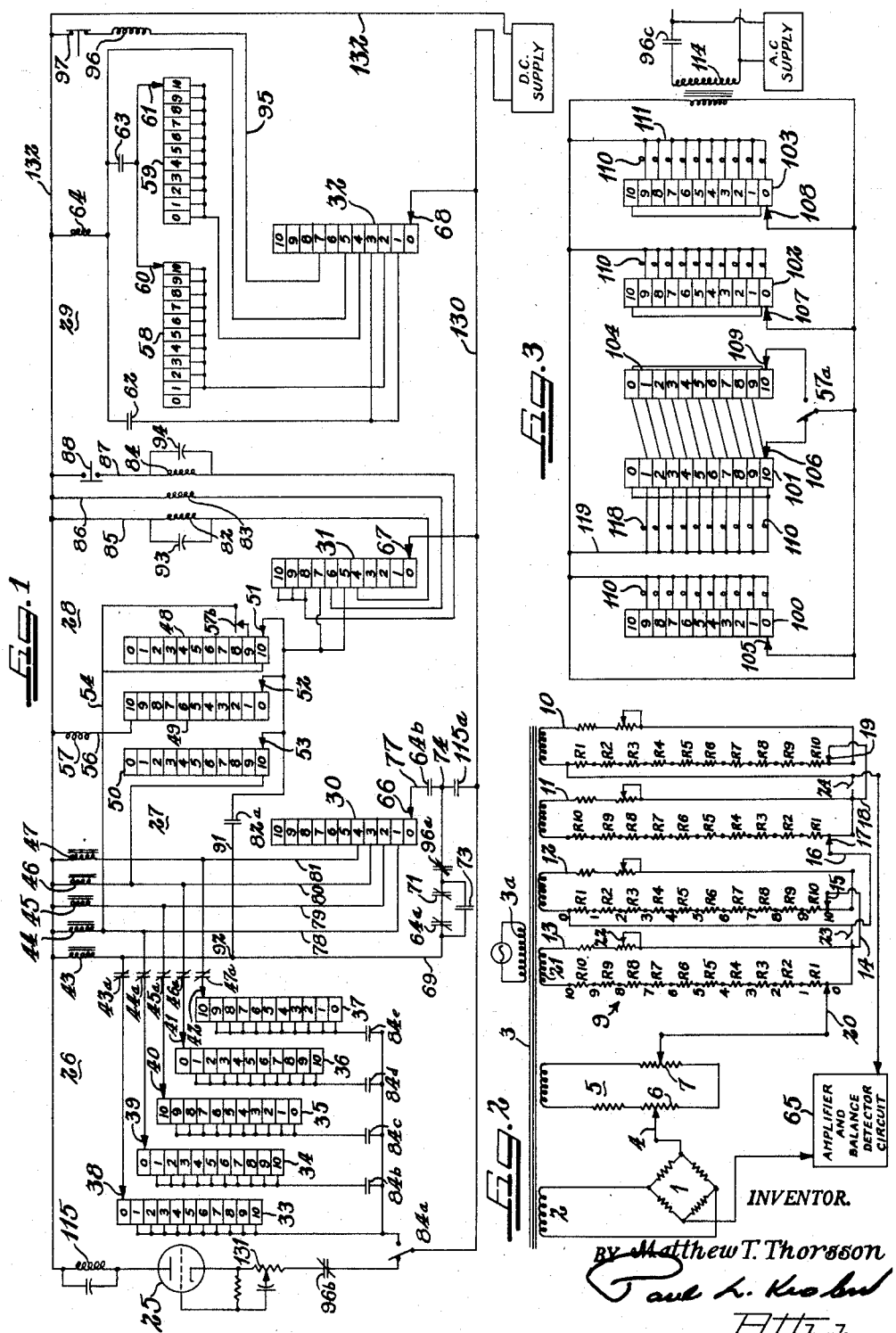

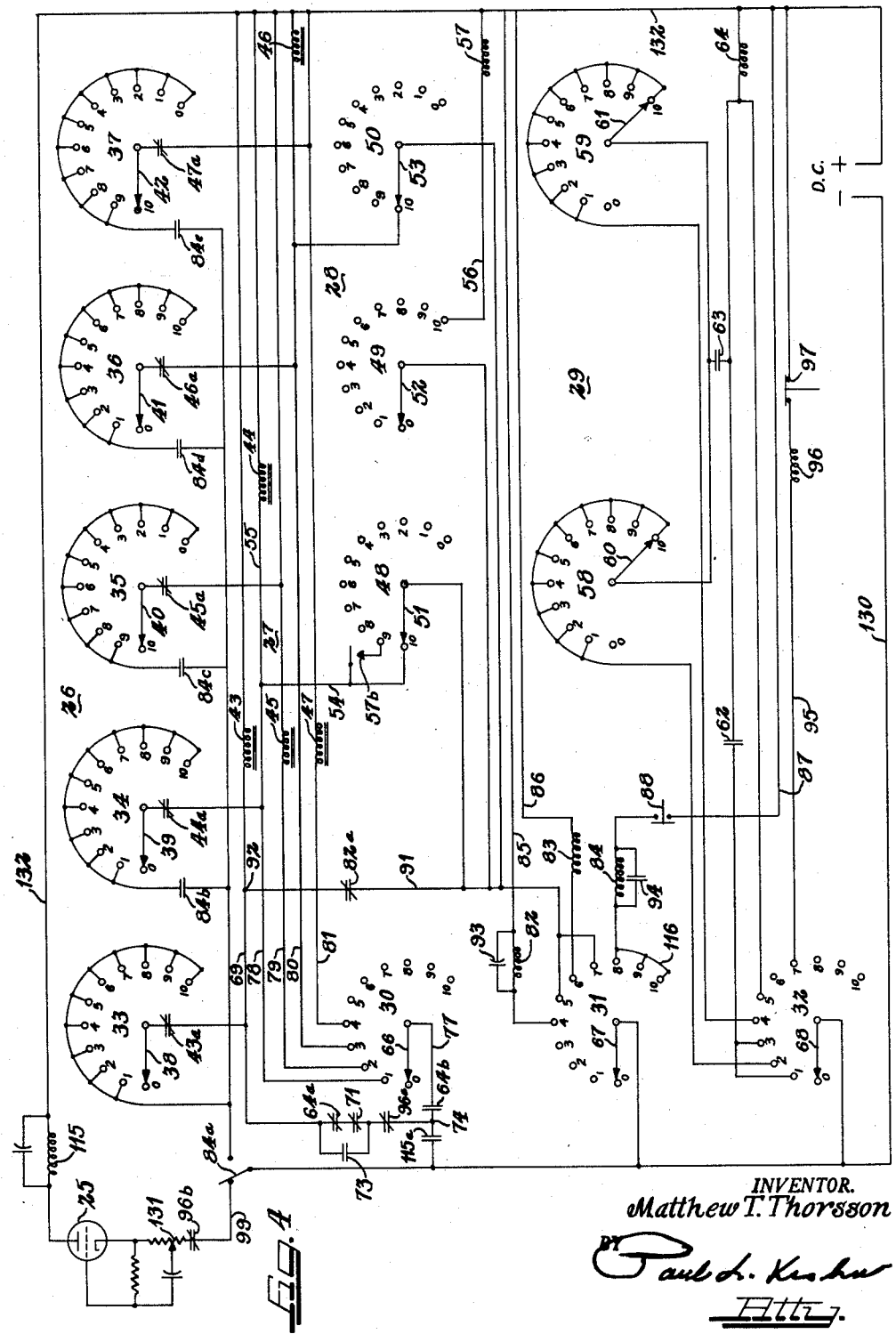

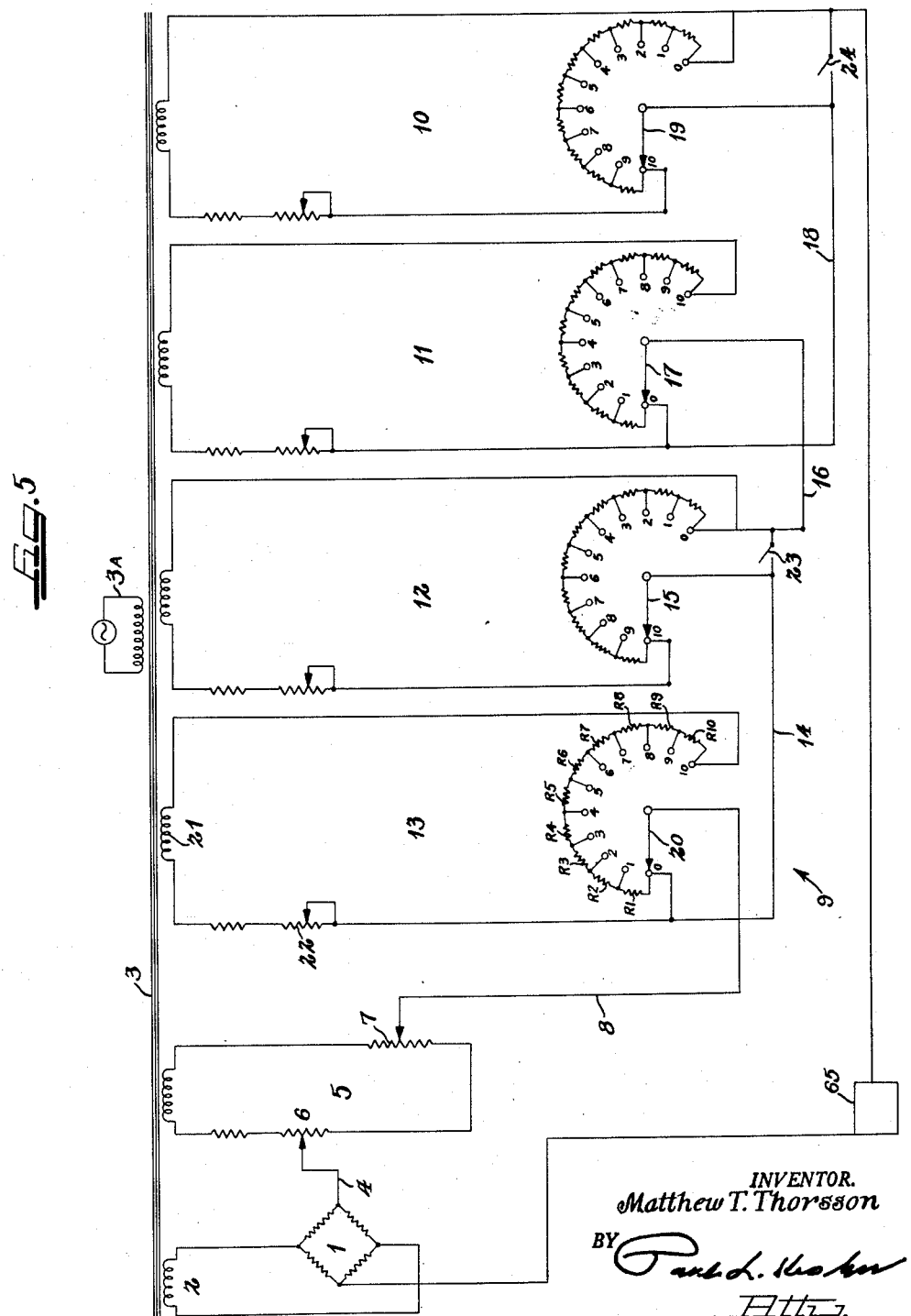

United States Patent Office 2,936,165
Patented May 10, 1960

2,936,165

DIGITAL BALANCING HIGH SPEED SCALE SYSTEM

Matthew T. Thorsson, Moline, Ill., assignor to Fairbanks, Morse & Co., Chicago, Ill., a corporation of Illinois Application November 1, 1955, Serial No. 544,170

13 Claims. (Cl. 265—70)

This invention relates generally to weighing systems and more particularly to a digital balancing high speed scale system for accurate and speedy weight measurements.

The primary object of this invention is to provide an electrical weighing system utilizing a high speed electrical balancing system to obtain quick and accurate measurements of weight.

A specific object of this invention is to provide an electrical weighing system in which an automatic balance is rapidly obtained.

Another object of this invention is to provide an electrical weighing system utilizing an automatic null seeking network, including resistances representing certain digital values, to balance out an applied load on the system.

A further object of this invention is to provide an electrical weighing system having an automatic null seeking network, with special provision for carry-over between different portions of the network, to balance out an applied load on the system.

A still further object of this invention is to provide an electrical weighing system having an automatic null seeking network with a carry-over system therein to balance out an applied load on the system and to correctly condition a read-out system in accordance with the operation of the network and the carry-over system therein.

Another object of this invention is to provide an automatic electrical weighing system having a null-seeking network with resistances representing certain digital values, and a control circuit to correctly and automatically select certain of the resistors in the network to balance out an applied load on the system and to condition the read-out circuit of the system.

With the foregoing and other objects in view, the invention resides in the following specification and appended claims, certain embodiments of which are illustrated in the accompanying drawings, in which:

Figure 1 is a schematic diagram of the control circuit for the weighing system of the invention;

Figure 2 is a schematic diagram of the load sensing circuit and the null seeking network of the invention;

Figure 3 is a schematic diagram of the read-out circuit for the invention;

Figure 4 is a schematic diagram similar to Figure 1 in circuitry, but shown differently for purposes of explanation;

Figure 5 is a schematic diagram similar to Figure 2 in circuitry, but shown differently for purposes of explanation;

Figure 6 is a schematic diagram similar to Figure 3, but shown differently for purposes of explanation; and Figure 7 is a functional diagram in block form of the illustrated embodiment.

In the digital balancing high speed scale system of the present invention, a voltage representative of the weight of an object placed on a scale platform is produced in a load cell. An opposing voltage producing circuit is connected to the load cell to produce a countervoltage. The voltage opposing circuit comprises four sections for producing opposing voltages in increments of 1000, 100, 10 and 1 pounds. Initially, there is no opposing voltage produced in the 1000 pound and 10 pound sections while a maximum countervoltage is produced in the 100 pound and 1 pound sections. A voltage balance sensing circuit is connected to the output of the series connection of the load cell and the voltage opposing circuit. If the voltage balance sensing circuit senses an excess of voltage in the load cell circuit over that in the voltage opposing circuit, sufficient additional voltage is introduced into the 1000 pound section of the voltage opposing circuit to overcome the excess voltage. At this time there will exist an excess of voltage in the voltage opposing circuit over that produced by the load cell and a control circuit energized by the balance detector circuit effects reduction of the voltage in the 100 pound section until the load cell voltage again exceeds the voltage of the voltage opposing circuit. Then, the control circuit under the influence of the balance circuit effects an increase of voltage in the 10 pound section until again the voltage produced in the voltage opposing circuit exceeds the voltage generated by the load cell. The control circuit again operates to reduce the voltage of the 1 pound section until a balance exists between the voltage of the load cell and the voltage opposing circuit. At this time a read out circuit which has followed the discrete steps of the 1000, 100, 10 and 1 pound sections as the voltages therein are increased or reduced is energized to indicate the weight of the object placed on the scale platform.

Referring more particularly to Figure 7, there is therein illustrated in block diagrammatic form a preferred embodiment of the invention. The block diagram of Figure 7 has been divided into three general areas by dashed lines. Each of the areas is identified by reference to the specific ones of Figures 1–6 which show in greater detail the particular electrical circuitry of the preferred embodiment. The solid lines connecting the various blocks have arrows which indicate the direction in which the control functions of the circuits in the blocks affect the circuits of other blocks.

Load cell block 1 represents a transducer whose output voltage is of a magnitude proportional to the load applied to a scale platform. A zero balancing bridge circuit 5 is connected in series with the load cell circuit 1 to permit compensation for any error caused by the platform weight in the customary manner. Null seeking balance network 9 generates a countervoltage to oppose that generated by load cell circuit 1. Amplifier and balance detector circuit 65 senses the algebraic sum of the load cell voltage and the null seeking balance network voltage. The null seeking balance network 9 of the preferred embodiment comprises four resistor sections one for each of four algebraic denominations; namely, thousands, hundreds, tens and units. As explained supra, the thousands and tens resistor sections introduce no initial countervoltage, while the hundreds and units resistor sections introduce a maximum amount of countervoltage in null balance seeking circuit 9. Each of these resistor sections is controlled by an associated stepping relay in sequencing circuit 27. Detector circuit 29, operated by amplifier and balance detector 65 and detector control circuit 32, effects operation of sequence control circuit 27 to step from one resistor section to another as each of the resistor sections contributes toward a null balance of the voltage from load cell circuit 1. A homing circuit 26 controls the operation of sequencing control circuit 27 to prepare the weighing system for the weighing cycle by setting each of the resistor sections to its initial condition as discussed above. Pulsing circuit 25 effects operation of sequencing circuit 27 to prepare the circuits of detector control circuit 32, sequencing control circuit 30 and carryover control circuit 31 to their positions for the initiation of the weighing cycle. A read out circuit (Figs. 3 and 6) is operated in conjunction with the setting of the resistors in the four resistor sections of null seeking balance circuit 9 to give an indication of the weight of the load on the platform. A carryover circuit 28 controlled by carryover control circuit 31 affects the read out circuit in a manner to be described hereinafter to give a correct indication of the weight.

Referring more particularly to Figures 2 and 5, a load cell for sensing loads on the system is shown arranged in the form of a resistance bridge 1 having a strain gage in each leg thereof. A load cell suitable for transforming an applied force or weight into an electrical signal proportional thereto is entirely conventional and commercially available, and may be of the SR–4 type manufactured by the Baldwin-Lima-Hamilton Co., Eddystone, Pa. The bridge 1 is energized from the secondary winding 2 of the transformer 3. Electrical power for the operation of the electrical scale is applied to the primary winding 3A from a source of alternating current in the well known manner. Connected in series with the bridge 1, over a conductor 4, is a zero balance bridge circuit 5. The purpose of bridge circuit 5 is to permit an initial balancing out of any signal from the bridge caused by the weight of the weigh platform. The adjustment of this bridge circuit 5 is manual and may be accomplished in the well known manner by adjustment of either or both of the variable resistors 6 and 7.

Connected in series with bridge 5, over a conductor 8, is a null seeking balance network generally indicated at 9. Network 9 includes a section corresponding to each digital position in the decimal numbering series, namely: units, tens, hundreds and thousands. In Figures 2 and 5 these sections are designated as 10 for units; 11 for tens; 12 for hundreds; and 13 for thousands. Additional sections for tens of thousands, hundreds of thousands, etc. may readily be added, depending upon the desired capacity of the weighing scale. The purpose of balance network 9 is to provide a voltage of equal magnitude but opposite in phase to that produced by bridge 1 in order to permit a determination of the weight of the object applied to bridge 1 in the manner described hereinafter.

Each section of network 9 is series connected to the next section. Section 13 is connected over conductor 14 to the movable contactor 15 of section 12. Section 12 is connected over conductor 16 to movable contactor 17 of section 11. Section 11 is connected over conductor 18 to movable contactor 19 of section 10.

Each section of network 9 includes a bank of ten resistors representing electrically one unit of digital information. Thus, in section 13 resistors $R_1$, $R_2$, $R_3$, $R_4$, $R_5$, $R_6$, $R_7$, $R_8$, $R_9$, $R_{10}$, each represent a unit in the thousands column for balancing out an applied load, as will be later described. The wiper 20 of section 13 is arranged to rotate in a clockwise direction to introduce resistors into the system. Section 13 is connected to the power source by a secondary winding 21 of transformer 3. Also included in section 13 in series with secondary winding 21 is a span adjustment resistor 22.

Sections 12 (for hundreds digits), 11 (for tens digits), and 10 (for units digits) are similar in arrangement to section 13, the primary difference being in the value of each resistor in the bank of ten for each section, each resistor representing one digit in the section where it is located. Additionally, sections 12 and 10 are connected so that when their wipers are in their normal rest position all of their resistances are connected in series in the circuit and as their wipers move in a clockwise direction appropriate resistances are removed from the circuit. Section 11 is similar to section 13 in that a clockwise rotation of its wiper introduces appropriate resistances into the section.

In order to correctly obtain a zero balance with bridge network 5, shorting switches 23 and 24 in balance network 9 are provided to exclude the normally included voltage drops across sections 12 and 10 respectively. Thus, with switches 23 and 24 closed, the only opposing voltage to any voltage developed at bridge 1 by a weigh platform applied thereto, will be created by the network 5.

The voltages from the output of bridge 1 and the null seeking balance network 9 are combined and applied to an amplifier and a balance detector circuit 65 which controls the operation of a polarized relay in a manner to be described hereinafter.

The positions of the movable contactors 20, 15, 17 and 19, of sections 13–10 respectively, are automatically controlled in accordance with the magnitude of an applied load to bridge 1 by means of the control circuit of Figures 1 and 4, reference to which is now made for the ensuing discussion. This control circuit consists generally of a pulsing tube 25, a homing circuit 26, a sequencing circuit 27, a carry-over circuit 28, a detector circuit 29, and a series of stepping control switches 30, 31, and 32.

The homing circuit 26 includes five adjustable contactor switches 33, 34, 35, 36, and 37—each of which is provided with a plurality of contact positions number 0–10. The contactor switches 33, 34, 35, 36, and 37 are provided with movable switch arms 38, 39, 40, 41 and 42 respectively.

Each of the contactor switches of circuit 26 is electrically connected with an operating coil in sequencing circuit 27, these coils being as follows: 43, 44, 45, 46, and 47. Coils 43–47 may be, for example, the operating coils of a stepping switch of the Ledex type or its equivalent. Each of coils 43–47 has associated herewith a normally closed contact of the group 43a–47a of circuit 26, which opens upon energization of its corresponding coil to provide a pulsing current for each of these relays. The coil 43 is the main stepper relay actuating coil and its operation will be fully described later in the specification. Coils 44–47 are individual actuating coils for sections 13, 12, 11, and 10 respectively of balancing network 9 and control the stepping actions of wipers 20, 15, 17, and 19 respectively.

The carry-over circuit 28 comprises three stepping contactor switches 48, 49, and 50—each having contact positions 0 through 10, and switch or wiper arms 51, 52, and 53 respectively. Contactor switch 48 is connected at position 10 over conductor 54 to a junction between contactor switch 34 and stepping coil 44 and at position 9 over contacts 57b to this same junction. Contactor switch 49 is connected at terminal 10 over a conductor 56 to a carry over relay coil 57 which is connected on its other side to the D.C. power supply. Contactor switch 50 is connected at position 10 over a conductor to the junction of stepping coil 46 and contactor switch 36. The remaining contacts of switches 48, 49, and 50 are open.

The voltage detector circuit 29 includes two stepping contactor switches 58 and 59, having adjustable mechanically coupled switch arms 60 and 61 which move in synchronism through 11 positions (0–10) of which position 1 is an open circuit.

The detector circuit further includes contactors 62 and 63 which are controlled in operation by a polarized relay coil energized by means of amplifier and balance detector 65. The specific and detailed circuitry for controlling contactors 62 and 63 is shown more fully in copending application having Serial Number 466,308 filed on Nov. 2, 1954, by Matthew T. Thorsson and Louis J. Lauler and entitled Voltage Responsive Circuits. The copending application illustrates an amplifier and balance detector having a pair of contacts, such that each is separately and individually closed in accordance with the voltage and phase difference between two input voltages applied to the amplifier. If the load cell voltage exceeds the opposing voltages, contacts 62 are closed while if the opposing voltage exceeds the load cell voltage, contacts 63 are closed. A relay coil 64 is prepared for energization by either contactor 62 or 63 which is closed in accordance with the magnitude and phase of an error voltage detected in the combination amplifier balance detector unit 65 illustrated in block form in Figure 2.

Each stepping control switch 30, 31, and 32 has a series of contact positions 0 through 10 corresponding to those similar positions on the above described contactor switches. Switches 30, 31 and 32 are provided with movable switch arms 66, 67, and 68 respectively, which move in synchronism from position to position on the switch banks under the control of main stepper relay 43.

Referring now to the electrical operating circuits for stepping coils 43–47 it will be noted that one side of these coils is connected to a D.C. supply over a conductor 132. The circuits connecting the other side of these coils to the D.C. supply will now be described. Main stepper coil 43 is connected over a conductor 69, normally closed contacts 64a and 71, which may be by-passed by closure of normally open contacts 73, and normally closed contacts 96a to a junction 74 between two contacts 64b and 115a, contacts 115a and conductor 130 to the D.C. supply. Coil 44 is connected over conductor 78 to contact position 1 on switch 30. Coil 45 is connected over conductor 79 to contact position 2 on switch 30. Coil 46 is connected over conductor 80 to contact position 3 on switch 30, and coil 47 is connected over conductor 81 to contact position 4 on switch 30. The wiper 66 of switch 30 is connected to the other side of the D.C. supply over contacts 64b, contacts 115a and conductor 130. Coils 43–47 are also connected respectively to wipers 38–42 of switches 33–37, whereat they are connected to the D.C. supply over normally open contacts 84a.

In order to illustrate in simplified form the control function of the various stepping coils reference may be had to the following chart which shows the stepping coil and wiper arm of its controlled switch.

CHART I

| Stepping coil: | Wiper arm of controlled switch |
|---|---|
| 43 | 38, 66, 67, 68. |
| 44 | 20, 39, 105. |
| 45 | 15, 40, 51, 60, 106, 109. |
| 46 | 17, 41, 52, 107. |
| 47 | 19, 42, 53, 61, 108. |

With reference to the above chart it should be understood that each wiper arm controlled by stepping coil 43 is advanced in a discrete step to a subsequent contact terminal on its associated switch for each energization of stepping coil 43. Further, all of the other wiper arms associated with stepping coils 44–47 continue to advance step by step during the period that their associated stepping coil is energized.

Connected to contact positions 4, 6 and 8 on switch 31 are relay coils 82, 83, and 84 respectively. Coils 82, 83, and 84 are connected to the D.C. supply on their opposite sides over conductors 85, 86 and 87 respectively. A normally closed switch 88 is provided in line 87 for zero testing of the system in an obvious manner. The coil 83 may be utilized to control the energization of a printer (not shown) or other indicator. The coil 84 controls the position of switch contact 84a and contact 84b–84e in homing circuit 26. Coil 82 governs the operation of a normally open contact 82a in branch conductor 91 leading from contact 5 on switch 31 to junction 92 in conductor 69. Contact 7 of switch 31 is connected to wipers 51–53 of switches 48–50. Relays 82 and 84 are provided with condensers 93 and 94 which determine certain time delay functions for coils 82 and 84, respectively.

Contact 7 of switch 32 is connected to the D.C. supply over conductor 95, control relay coil 96, and the normally closed contacts of start switch 97. Coil 96, when energized, holds contacts 96a open to prevent further energization of stepping coil 43 and also opens contacts 96b in a conductor extending from the contacts 84a to pulsing tube 25. Thus, with the system at rest, and contactor switch arms 66, 67 and 68 on the position 7, the stop or open position, an opening of switch 97 will deenergize coil 96 to move the system into active condition through action of the pulsing tube 25, as will be later described.

Now, referring more particularly to Figures 3 and 6, constituting the read-out system, a plurality of contactor switch banks 100, 101, 102, 103, 104 are illustrated having movable switch arms 105, 106, 107, 108, and 109, respectively. Switches 100–104 and their associated indicating equipment indicate the thousands, hundreds, tens and units digits of the weight of the object placed on the weighing platform. Each contactor switch bank has a plurality of contact positions 0 through 10 corresponding to the similar positions of the above described contactor switches, and the arms 105, 106, 107, and 108 are individually positioned by mechanical coupling with arms 20, 15, 17 and 19 in the opposing voltage producing circuit. Arm 106 is mechanically coupled also with arm 109 so that the two arms move jointly with arm 15 of the opposing voltage producing circuit of Figures 2 and 5.

Each contact position of the banks 100, 101, 102, and 103 is series connected through a particular one of a series of lamps 110, or other indicators, to a source of A.C. supply represented by the secondary winding of a transformer 114. For example, in the bank 103, arm 108 is on the 0 position. Lamp 110 connected to the 0 contact is further connected to conductor 111, common to all the lamps, which, in turn, is connected by a conductor 120 to the A.C. supply.

To determine whether the circuits through contactor switch bank 101 or 104 should be effective, depending on the necessity for carry-over in a particular weighing operation, a contactor arm 57a is provided. This contact arm 57a is controlled by carry-over relay 57 of the carry-over circuit 28 and its normal position is "closed" to the left as shown in Figure 3 to energize contact bank 101 (to the right in Fig. 6). Upon energization of relay 57, contact arm 57a is moved to the right in Figure 3 and to the left in Figure 6. To render the read-out circuit "on" or "off" a switch 96c is provided on the primary side of transformer 114 connected to the A.C. supply. This switch 96c is automatic in operation and is always open until a weighing cycle is complete to avoid premature energization of the lamps 110. Switch 96c is actuated from its normally open position to a closed position by coil 96 in the control circuit as the weighing cycle ends and the switch arms 66, 67, and 68 arrive at position 7.

In considering the operation of this weighing system, it is important to note that all contactor arms 66, 67, and 68 are shown in the control circuit at the 0 contact position. The actual null or stop position for the arms is the 7 position, as will become apparent later in the specification. Also it is to be noted that the arms 20, 15, 17 and 19, in the opposing voltage circuit 9, are illustrated in their home or start position.

Operation

The system operates generally as follows:

With the contactor switch arms 66, 67, and 68 of the control circuit in position 7, the stopping point from a previous cycle, and a load applied to the load cell 1, the start switch 97 is manually opened to interrupt the energizing circuit for coil 96. With coil 96 deenergized contacts 96c controlled thereby opens to extinguish power to the read-out circuit. Also with coil 96 deenergized, relay switch contacts 96b controlled by the coil reclose to complete a circuit through pulsing tube 25 and coil 115, which circuit extends from the D.C. supply, over conductor 130, contacts of switch 84a, contacts 96b, pulsing tube 25 and its associated bias resistor 131, relay coil 115 and conductor 132 to the D.C. supply. Also, the deenergization of coil 96 closes normally closed contacts 96a to thereby condition the pulsing coil 43 for operation. Coil 115 controls normally open pulsing contacts 115a and operates, when energized, to automatically and momentarily close these contacts. Closure of contacts 115a completes a circuit from one side of the D.C. voltage supply, over conductor 130, over contacts 115a, contacts 96a, and normally closed contacts 71 and 64a through the stepping relay coil 43 and over conductor 132 to the other side of the D.C. voltage supply. Energization of coil 43 operates a stepper mechanism (not shown) to move contactor arms 66, 67, and 68 of switches 30–32 respectively from position 7 to position 8. Arm 67 of switch 31 at position 8 closes a circuit through relay coil 84 which, when energized, moves contactor switch 84a to the right as viewed in the drawings, thereby interrupting the circuit through the pulsing tube 25 and preparing an energizing circuit for all of the contactor switches 33, 34, 35, 36 and 37 in homing circuit 26. Energization of coil 84 causes closure of contacts 84b–84e which are in the stepping circuits for coils 44–47 respectively. In the homing circuit 26 all the contactor wiper arms 38–42 are shown in their cycle initiating condition. The home position for the wipers of switches 33, 34, and 36 are shown in the 0 position while the wipers for switches 35 and 37 are shown in position 10. This arrangement is provided so that stepping coils 44–47 step their corresponding wipers 20, 15, 17, and 19 in null balance circuit 9 to their proper initiating positions; namely, "0" for sections 13 and 11, and "10" for sections 12 and 10 for the start of each weighing cycle. It will be remembered in this regard that sections 13 and 11 provide a zero opposing voltage and sections 12 and 10 a maximum opposing voltage at the beginning of the weighing cycle. As each of the wipers 38–42 reaches its open position ("0" for switches 33, 34, and 36 and "10" for switches 35 and 37), the energizing circuit for its corresponding stepping relay 44–47 is interrupted to stop further movement of the wipers 20, 15, 17 and 19.

More specifically, in order to reach the starting position it is necessary to maintain the relay coil 84 energized. Upon operation relay coil 84 moves contactor 84a to the right and closes contacts 84b–84e. Relay coil 84 is energized over a circuit through switch 31 by connecting contact positions 8, 9 and 10 together by means of a shorting strap 116.

In the homing operation, by having the contactor switch arm 38 engage the dead or open position 0 on switch 33, the coil 43 is maintained in deenergized condition, thus preventing further stepping of the switches 30, 31, 32 controlled thereby. Actually, from a previous weighing operation the arm 39, for example, may have been left at position 3. The coil 44, which is energized through contacts 84a and contacts 84b, will actuate a stepper mechanism (not shown) to move contactor switch arm 39 back to contact 0. This stepper mechanism also simultaneously moves arm 20 in circuit 9 to its home position, and contactor switch arm 105 in the read-out circuit to its zero or home position. A similar stepper mechanism (not shown) is controlled by each of the coils 45, 46 and 47 for a similar purpose.

When the homing operation is completed and all contactor switch arms reach the open circuit position, the energizing circuits through coils 43–47 are interrupted. As stepping switch arm 67 reaches position 0, the energizing circuit for coil 84 is interrupted, thus permitting contactor arm 84a to swing back to the left in the drawings to reenergize the pulsing tube 25. Coil 115, energized by the tube circuit, closes contacts 115a again and the coil 43 will operate the stepper mechanism for switches 30, 31 and 32 to move them to contact position 1 from which the actual weighing operation begins.

The sections 10, 11, 12 and 13, of circuit 9, each having digital resistors $R_1$ through $R_{10}$ are set up in the drawing to supply one thousand and ten pounds of equivalent voltage to oppose a voltage developed by a weight applied to bridge 1. In accordance with the circuit 9 illustrated in Figures 1 and 5 only the hundreds and tens circuits 12 and 10 are arranged to produce an opposing voltage at the initiation of the weighing operation. The purpose of the control system is to properly adjust the arms 20, 15, 17 and 19 to include those resistors which will develop an opposing voltage of equal magnitude and opposite phase to the load cell voltage. When this balance condition is reached, the read-out system will indicate the actual weight applied to bridge 1.

The operation may be best further described by assuming that a weight of twenty-five hundred and thirty-two pounds is applied to bridge 1. The opposing voltage circuit 9, at this initial stage, provides only one thousand and ten pounds of opposing voltage because of the resistance in circuits 12 and 10. This excess of load cell voltage over the opposing voltage is amplified and detected by balance detector-amplifier 65. The unit 65 determines whether contacts 62 or 63 in the detector circuit portion of the control circuit will be closed to prepare an energizing circuit for relay coil 64. Contacts 62 close when the voltage of the balance circuit is less than the load cell voltage. Contacts 63 close when the balance circuit voltage exceeds the load cell voltage. In the assumed case, the initial conditions is that the load cell voltage exceeds the balance circuit opposing voltage and, therefore, contacts 62 will close.

It will be recalled that when wiper 67 of switch 31 was stepped to position 0, the energizing circuit for relay 84 was interrupted. Relay 84 releases and moves its wiper 84a to the left to complete an energizing circuit for relay coil 115.

Relay coil 115 operates and at its contacts 115a completes an energizing circuit for stepper relay 43, which circuit extends from one side of the D.C. voltage supply, over conductor 132, the winding of coil 43, conductor 69, contacts 64a, contacts 71, contacts 96a, contacts 115a and conductor 130 to the other side of the D.C. voltage supply.

The switch arms 66, 67, and 68 are stepped to position 1 by the stepper coil 43. It is readily apparent in the control circuit that a circuit is closed at this position through arm 66 to coil 44, which, when energized, will operate its associated stepper mechanism (not shown) to move the thousands digit arm 20, the homing circuit arm 39, and the read-out circuit arm 105. In the assumed case of 2532 pounds the arm 20 will be moved to include resistors $R_1$ and $R_2$, each representing, from a voltage standpoint, one-thousand pounds of opposing voltage. At this point the opposing voltage or balance circuit will include the two-thousand pounds in section 13, the one-thousand pounds in section 12, and the ten pounds in section 10 for a total of three-thousand and ten pounds of voltage.

The opposing voltage now exceeds the applied load cell voltage by an amount of 522 equivalent volts and the balance detector relay mechanism at 65 will operate to open contacts 62 and close contacts 63. As contacts 62 are opened, coil 64 will deenergize to close contacts 64a in series with stepping coil 43 to index or step the switch arms 66, 67, and 68 to contact position 2. Since the arm 60 of the detector circuit 29 is in position 1 and contacts 63 closed, coil 64 will again be energized through switch arm 86 in contact position 2. With the switch arm 66 of switch 30 on contact position 2 and coil 64 energized to close normally open contacts 64b, a pulsing circuit is completed through coil 45 and that coil through its stepper mechanism steps switch arm 15 until that arm reaches the juncture between the $R_5$ and $R_6$ resistors, or the 500 pound position. At this point the thousands resistors of section 13 provide 2,000 pounds of opposing voltage, the hundreds resistors in section 12 provide 500 pounds of opposing voltage, the tens resistors in section 11, zero voltage, and the units resistors of section 10 provide 10 pounds of opposing voltage for a total of 2,510 pounds of opposing voltage, which is less than the 2,532 pounds provided by the load cell.

The balance detector relay unit 65 again operates to open contacts 63 and close contacts 62. Coil 64 is deenergized as contactor 63 opens to again close contacts 64a to pulse the circuit and step the switch arms 66, 67, and 68 to position 3. With contacts 62 closed, the coil 64 is again energized when the wiper 68 of switch 32 reaches contact position 3. With coil 64 energized, contactor 64a is again opened to stop the stepping by coil 43, and contactor 64b is closed to energize coil 46 over a circuit extending from one side of the D.C. voltage supply, over conductor 132, the winding of relay 46, conductor 80, contact 3 and wiper 66 of switch 30, contacts 64b, contacts 115a and conductor 130 to the other side of the D.C. voltage supply. Coil 46 operates to move the arm 17 of section 11 to the thirty-pound position, that is, it is moved to include $R_1$, $R_2$ and $R_3$ resistors, each representing ten pounds of voltage in the circuit. At this point, section 13 is supplying two thousand pounds of voltage, section 12 five hundred pounds of voltage, section 11, thirty pounds of voltage, and section 10 ten pounds of voltage for a total of twenty-five hundred and forty pounds, which value exceeds the load cell voltage by eight pounds.

The balance detector relay unit 65 operates to reopen contacts 62 and close contacts 63. The opening of contacts 62 deenergizes coil 64 to close contactor 64a and open contacts 64b to complete an energizing circuit for stepping coil 43 which advances the switch arms 66, 67, and 68 to contact position 4. Since the arm 61 of switching contactor 59 is in position 4, coil 64 will be energized via switch arm 68 to close contacts 64b which completes an energizing circuit for relay coil 47. Such circuit extends from one side of the D.C. voltage supply, over conductor 132, the winding of coil 47, conductor 81, contact position 4 and wiper 66 of switch 30, contacts 64b, contacts 115a and conductor 132 to the other side of the D.C. voltage supply. Coil 47, thus energized, steps the switch arm 19 to remove resistors $R_3$ through $R_{10}$ or eight pounds from the circuit. At this point the sections 10, 11, 12 and 13 of circuit 9 supply exactly twenty-five hundred and thirty-two pounds of voltage to oppose the load cell voltage as was originally assumed and the circuit is balanced.

As balance occurs, the detector relay in unit 65 opens contacts 63 and closes contacts 62 to momentarily deenergize coil 64 and thereby energize coil 43, as previously described, to step the switch arms 66, 67 and 68 to contact position 5. At the contact position 5, the switch blade 67 of switch 31 completes an energizing path for the carry-over circuit 28 so that if either of the switch arms 19 and 15, in the circuit 9 associated with the hundreds, and units resistors is in the tenth contact position, the carry-over circuit will cause the particular switch arm for the next higher order digit to move one more position. With the example described above, the switch arms 15, 17 and 19 will be in the positions: five, thirty, and two, respectively. By tracing from contact position 5 on switch 31, it will be seen that no circuit is completed to pulse coils 45, 46, or 47 since no carry-over is required. More specifically, the switch arm 51 of contactor switch 48, under the example given, will be in the #5 position corresponding to five-hundred pounds, its position having been determined by pulsing coil 45. In order to provide for carry-over, the arm 51 would have to engage either the 9 or 10 position to pulse coil 44 and thereby advance the thousands arm 20 one position. In a similar manner arm 53 of contactor switch 50 would have to engage contact position 10 to pulse coil 46 and thereby advance the tens arm 17 one position.

In order to explain the function of the carry-over circuit 28 in greater detail, the operation of each of the switches 48, 49 and 50 will be considered. The operation of switch 50 associated with the units section 10 of balance circuit 9 will be explained first. Assume an object weighing 2550 pounds is to be weighed. It will be recalled that section 10 of circuit 9 is arranged to have a voltage equivalent of 10 pounds at the start of the weighing cycle. Now section 13 introduces 3000 equivalent volts, section 12 removes 500 equivalent volts and section 11 adds 40 equivalent volts. At this time because section 10 already has 10 equivalent volts introduced into into the system, the total opposing voltage will be 2550 equivalent volts. However, the read out circuit will read 2540 pounds since the wiper 17 of section 11 and wiper 107 of section 102 of the read out circuit rest on contact 4. It is then necessary to advance the wiper 107 of the read out circuit to position 5 and this is accomplished over a circuit from the D.C. supply over conductor 132, the winding of coil 46 (which controls the advancement of wiper 107), contacts 10 and wiper 53 of switch 50 contacts 5 and wiper 67 of switch 31 and conductor 130 to the D.C. supply. Hence, wiper 107 of switch 102 in the read-out circuit is advanced one step to read 2550 pounds, the correct weight.

If carry-over is required between the tens section 11 and the hundreds section 12, a special circuit is provided by the conductor 56 connected between contact position 10 on contactor switch 49 and a carry-over relay coil 57. This coil 57, when energized, will move the armature 57a in the read-out circuit to the left in Figure 6 (to the right in Figure 3) to close an auxiliary circuit through switches 104. When, for example, the switch arms 109 and 106 of switches 104 and 101 are both on position 0 and a carry-over is required, then the circuit through switch arm 106 is broken as contactor 57a closes a circuit through arm 109, conductor 117, light 118, and conductor 119 to the A.C. supply. Thus, although arm 109 is in the 0 position, the light 118 for position 1 is energized when a carry-over is required, thereby giving the correct hundreds value.

For an explanation of the operation of switch 48 in carry-over circuit 28 let it be assumed first that in the weighing operation wiper 51 of switch 48 and wiper 15 of section 12 of the voltage opposing circuit 9 are resting on position 9 and that a digit is to be carried over from the tens section 11. In this case wiper 52 of switch 49 and wiper 17 of section 11 must both be resting in position 10. In the manner previously explained coil 57 is energized through wiper 52 of switch 49 and contacts 57b are closed. A circuit for the energization of thousands stepping coil 44 is completed from the D.C. supply over conductor 132, the winding of stepping coil 44, conductor 54, contacts 57b, contacts 9 and wiper 51 of switch 48, contacts 5 and wiper 67 of switch 31 and conductor 130 to the D.C. supply.

Stepping coil 44 operates to advance the thousands readout wiper 105 one step. Simultaneously with energization of coil 57, arm 57a of the read-out circuit will be moved to the right and light #0 will be energized. Thus, one is added to the thousands reading and the hundreds reading now reads 0 instead of 9.

If only the tenth hundreds digit need be carried over to the thousands read-out column, then wiper 51 of switch 48 will be on position 10. In this case an obvious energizing circuit will be completed for stepping coil 44 and the thousands read-out wiper 105 of switch 100 will be advanced by one position to indicate the carry-over. The next highest light for the thousands column will be illuminated. There will be no change in the read-out circuit of the hundreds column and the light representative of "0" will remain illuminated.

In order for the carry-over circuits to have time to function, a tank circuit, including coil 82 and condenser 93, is provided to delay the pulsing of stepper coil 43 through contacts 82a which are normally closed. As shown, the tank circuit is energized when switch arm 67 on switch 31 engages position 4. When arm 67 moves to position 5, the carry-over position, contacts 82a are held open for a predetermined time delay, as governed by condenser 93 until the carry-over circuit has time to function, if necessary. When the current flow in the tank circuit falls below a predetermined value, contacts 82a reclose and complete a circuit for pulsing coil 43 and move arms 66, 67 and 68 to position 6. At position 6 of switch 31, a circuit is closed through coil 83 which, as previously mentioned, initiates the operation of a printer or other indicator (not shown). As this operation is completed contacts 73, controlled by coil 83 in series with coil 43, are closed to pulse the coil and step arms 66, 67, and 68 to position 7. In position 7 the wiper arm 68 of switch 32 completes a circuit through coil 96 to close contacts 96c in the primary winding of transformer 114 in the read-out circuit. This also completes the operation of the pulsing coil and the weighing cycle since contacts 96b are held open by energized coil 96 to prevent further stepping of switches 30, 31, and 32 until the start switch 97 is again opened. The read out contactor switch banks 100, 101, 102, 103 and 104 having been energized by the closure of switch 96c will illuminate those of lamps 110 which will indicate the twenty-five hundred and thirty-two pounds weighed during the cycle. The arm 105 will be on position 2 lighting the light in series therewith representing the digit two in the thousands column. The arm 106 will be in the position 5 lighting the lamp in series therewith representing the digit five in the hundreds column. The arm 107 will be on position 3 to light a lamp representative of the digit three in the tens column, and the arm 108 will be on contact position 2 to light a lamp representative of the digit two in the units column.

In the position shown in Figure 6, all of the arms 105, 106, 107 and 108 engage contact. If the read out circuit were energized at this point the lamps in series with all contact positions 0 would light to give a zero indication in each of the digital columns represented by the contactor switch banks of the read out circuit.

Referring more specifically to switches 58 and 59, these are provided to effect control of the stepping cycle of relay coils 45 and 47. Whenever the wipers 66 and 68 of switches 30 and 32 respectively are in position 2, energizing paths for relay coils 45 and 64 are completed. The energizing path for relay coil 64 extends from one side of the D.C. voltage supply, over conductor 132, the winding of relay coil 64, contacts 63, wiper 60, the contacts of switch 58, contacts 2 and wiper 68 of switch 32 and conductor 130 to the other side of the D.C. voltage supply. The energizing path for relay coil 45 extends from the D.C. voltage supply, over conductor 132, the winding of coil 45, conductor 79, contacts 2 and wiper arm 66 of switch 30, contacts 76, contacts 75, and conductor 130 to the other side of the D.C. voltage supply. Similar circuits may be traced for the energization of coils 47 and 64 during the weighing operation for the units digit.

It will be recalled that the resistors of sections 12 and 10 of network 9 are removed sequentially from the voltage balancing network until the load cell voltage exceeds the balance bridge opposing voltage. It is apparent that if the resistors are completely removed from the circuit, a means must be provided to interrupt the energizing circuits for pulsing relays 45 and 47. This means comprises switches 58 and 59 wherein their contact positions 1–10 are connected to provide an energizing circuit for such relays, and contact positions 0 of each switch present an open circuit to interrupt their energizing circuits.

It is now apparent, therefore, that this invention provides for fully automatic electrical weighing of weights applied to the bridge 1. It should also be readily apparent that the system is capable of measuring any physical force applied to bridge 1 and is not limited to checking weights.

The operation of setting up the correct resistors in circuit 9 to balance out a voltage developed at the bridge 1 during a weighing operation, together with the simultaneous arrangement of the read-out operation, together with the simultaneous arrangement of the read-out lamp banks is quite rapid to give the operator a quick and accurate indication of the applied weight. A minimum amount of effort is required of the operator who merely has to open switch 97 and note the illuminated lamp positions in the read-out circuit to see how much weight was applied to bridge 1.

It is obvious that certain modifications of various portions of the circuit may become apparent to one skilled in the art, and this inventor intends that the invention be limited in protection only by the scope of the appended claims as applied to the specification or obvious modification thereof.

I claim:

1. A force measuring system adapted to measure the value of a signal voltage proportional to the magnitude of an applied force, comprising a signal voltage developing means, a balancing circuit connected in series with said means including a first section of resistors and a second section of resistors connected to said signal developing means, switch means operative to render the resistors of said first section of resistors effective to produce a voltage in phase opposition to said signal voltage and of greater magnitude than said signal voltage, switch means operative to render the resistors of said second section of resistors effective to decrease the balance circuit voltage produced by said first section of resistors toward a balanced electrical condition, and readout circuit means connected to said balancing circuit conditioned in accordance with the final adjustment of each resistor section to indicate the value of the applied force.

2. A force measuring system adapted to measure the value of a signal voltage proportional to the magnitude of an applied force comprising a signal voltage developing means, a balancing system including a plurality of resistor sections connected to said signal developing means, each of said sections corresponding to a digital position in the Arabic number series, namely: units, tens, hundreds, thousands, and so forth, switch means operative to render the resistor section corresponding to the highest order digital position as required by a particular applied force effective to produce a voltage in phase opposition to said signal voltage and of a magnitude greater than the signal voltage, switch means operative to render the resistor section corresponding to the second highest order digital position effective, to produce a voltage in phase opposition to the signal voltage and of such a magnitude as to decrease the total opposing voltage below the magnitude of the signal voltage, switch means for each of the remaining resistor sections to sequentially render said sections effective to produce voltages to raise and to lower the total opposing voltage of the balancing system relative to the signal voltage by decreasingly deviating magnitudes until an exact balance is attained, means to control the operation of said switch means, and readout circuit means conditioned in accordance with the final adjustment of each resistor section to indicate the value of the applied force.

3. An electrical weighing system comprising load cell means adapted to develop a voltage proportional to a weight applied thereto, a null seeking balancing network connected to said load cell means and including a first section of resistors and a second section of resistors, switch means operative to render the resistors of said first section of resistors effective to produce a voltage in phase opposition to a signal voltage from the load cell and of greater magnitude than said signal voltage, switch means operative to render the resistors of said second section of resistors effective to decrease the balance circuit voltage produced by said first section of resistors toward a balanced electrical condition, means to control the operation of said switch means, and readout circuit means connected to said balancing network conditioned in accordance with the final adjustment of each resistor section to indicate the value of the applied weight on the load cell means.

4. An electrical weighing system comprising load cell means adapted to develop a voltage proportional to a weight applied thereto, a null seeking balancing network connected to said load cell means and including a plurality of resistor sections, each of said sections corresponding to a digital position in the Arabic number series, namely: units, tens, hundreds, thousands, and so forth, switch means operative to render the resistor section corresponding to the highest order digital position as required by a particular applied weight effective to produce a voltage in phase opposition to the load cell voltage and of a magnitude greater than the load cell voltage, switch means operative to render the resistor section corresponding to the second highest order digital position effective to produce a voltage in phase opposition to the load cell voltage and of such a magnitude as to decrease the total opposing voltage below the magnitude of the load cell voltage, switch means for each of the remaining resistor sections to sequentially render said sections effective to produce voltages to raise and to lower the total opposing voltage of the balancing system by decreasingly deviating magnitudes until an exact balance is attained, means to automatically control the operation of said switch means, and readout circuit means conditioned in accordance with the final adjustment of each resistor section to indicate the magnitude of the applied weight.

5. An electrical weighing system comprising load cell means adapted to develop a voltage proportional to a weight applied thereto, a null seeking balancing network connected to said load cell means and including a plurality of resistor sections, each of said sections corresponding to a digital position in the Arabic number series, namely: units, tens, hundreds, thousands, and so forth, switch means operative to render the resistor section corresponding to the highest order digital position as required by a particular applied weight effective to produce a voltage in phase opposition to the load cell voltage and of a magnitude greater than the load cell voltage, switch means operative to render the resistor section corresponding to the second highest order digital position effective to produce a voltage in phase opposition to the load cell voltage and of such a magnitude as to decrease the total opposing voltage below the magnitude of the load cell voltage, switch means for each of the remaining resistor sections to sequentially render said sections effective to produce voltages to raise and to lower the total voltage of the balancing system by decreasingly deviating magnitudes until an exact balance is attained, means to automatically control the operation of said switch means, balance detector means in circuit with said load cell and said balancing network and acting to initiate operation of the control means until a balanced voltage condition is reached between the load cell and said balancing circuit, and readout circuit means conditioned in accordance with the final adjustment of each resistor section to indicate the magnitude of the applied weight.

6. An electrical weighing system comprising load cell means to receive a weight and develop a voltage proportional thereto, a null seeking balancing network including a plurality of adjustable resistor sections, each section having a plurality of resistors each of incremental digital value and each section representing a numerical digit position, a balance detector means in circuit with said load cell means and said balancing network, a readout circuit including switch controlled plural indicating means corresponding to each incremental digit value of each resistor for each section, and an auxiliary switch for one of the indicating means, first switch means to adjust each of said resistor sections and each of said readout indicating means, a detector switching circuit to receive unbalance information from said balance detector in order to condition each of said first switch means for operation, second switch means interconnected between said first switch means and said detector circuit means to sequentially close circuits through said first switch means, means to intermittently step said second switch means, a carry-over circuit interconnected between said second switch means and certain of said first switch means and including a relay operable when energized to close a circuit through the auxiliary switch of the readout circuit to provide a carry-over in one of the indicating means of the readout circuit, and means to initially energize the system to step said second switch means to its first contact position, the said second switch acting to de-energize the system after a complete stepping cycle by arriving at an open contact position.

7. An electrical weighing system comprising load cell means to receive a weight and develop a voltage proportional thereto, a null seeking balancing network including a plurality of adjustable resistor sections, each section having a plurality of resistors each of incremental digital value and each section representing a numerical digit position, a balance detector means in circuit with said load cell means and said balancing network, a readout circuit, first switch means to adjust each of said resistor sections and the readout system, second switch means to singly energize one of said first switch means at each contact position of a plurality of contact positions including an open position provided thereon, a carry-over circuit interconnected with said first switch means and having a portion effective when energized to effect a carry-over in one portion of the readout circuit, means to initially step the second switching means to its first closed contact position from its open contact position, a homing circuit for said first switch means and the resistor sections controlled thereby, energized through said second switch means in its first closed contact position, means to intermittently step said second switch means through its other contact position back to its open position, detector circuit means controlled by said balance detector means to first alternately energize said first switch means for each resistor section and then the intermittent stepping means for said second switch means, and circuit means connected between a contact position of the second switch following the first switch contact positions and the carry-over circuit to condition the carry-over circuit for energization.

8. An electrical weighing system comprising load cell means to receive a weight and develop a voltage proportional thereto, a null seeking balancing network including a plurality of adjustable resistor sections, a balance detector means in circuit with said load cell means and said balancing network, a readout circuit, a switch means to adjust each of said resistor sections and the readout system, switch means to individually energize one of said resistor switch means at each contact position of a plurality of contact positions including an open contact position provided thereon, a carry-over circuit interconnected with certain of said resistor switch means and having a portion effective when energized to effect a carry-over in one portion of the readout circuit, means to initially step the second switching means to its first closed contact position from its open contact position, a homing circuit for said resistor section switch, means energized through said second switch means in its first closed contact position, means to intermittently step said second switch means through its other contact position back to its open position, detector circuit means controlled by said balance detector means to alternately first energize a resistor switch means and then the intermittent stepper means for said second switch means, and circuit means connected between a contact position of the second switch following the resistor section switch contact positions and the carry-over circuit to condition the carry-over circuit for energization.

9. A read out device for indicating in decimal form a numerical value comprising a plurality of groups of indicators, said groups corresponding respectively to denominational orders in a decimal numerical system, said indicators of each group individually corresponding to the digits 1–10, each of said groups including a wiper and contacts for completing an energizing circuit to a selected one of said indicators of said group, an auxiliary group of contacts having an associated wiper, said wiper of said auxiliary group operating in stepped coincidence with the wiper of one of said plurality of groups and having its contacts connected respectively to the next lower numerical contacts of said one of said plurality of groups, relay stepping means individual to each group for stepping said wiper of each group to complete said preselected indicator circuits, carry over means comprising a plurality of stepping switches, certain of said stepping switches being connected to the one of said relay means individual to the group of indicators corresponding to the next higher denominational order for selectively completing an energizing circuit for energization of said relay means to advance said wiper of said group controlled by said relay means to complete an energizing circuit for the next higher numerical indicator, and another of said stepping switches being operative at one of its positions to complete an associated relay circuit for switching an energizing circuit from said one of said groups to said auxiliary group.

10. A read out device for indicating in decimal form a numerical value comprising: at least three groups of indicators, said groups corresponding respectively to the units, tens and hundreds denominational orders of a decimal numerical system, said indicators of each group individually corresponding to the digits 1–10, each of said groups including a wiper and contacts for completing an energizing circuit to a selected one of said indicators of said group, an auxiliary group of contacts having an associated wiper, said wiper of said auxiliary group operating in stepped coincidence with the wiper of the one of said three groups corresponding to the hundreds denominational order, and having its contacts connected respectively to the next lower numerical contacts of the said one of said three groups, relay stepping means individual to each group for stepping said wiper of each group to complete said preselected indicator circuits, carry over means comprising a plurality of stepping switches, said stepping switches being associated respectively with said groups of indicators corresponding respectively to the units, and tens denominational orders, each of said stepping switches having a wiper and ten contact positions, the wiper of each stepping switch operating in stepped coincidence with the wiper of its associated group, the tenth contact of the one of said stepping switches corresponding to the units indicator group being connected to the relay stepping means for the wiper of the tens group of indicators, the tenth contact of the one of said stepping switches corresponding to the tens indicator group being connected to a relay coil for switching an energizing circuit from said hundreds denominational group to said auxiliary group of indicators.

11. A read out device for indicating in decimal form a numerical value comprising at least four groups of indicators, said groups corresponding respectively to the units, tens, hundreds and thousands denominational orders in a decimal numerical system, said indicators of each group individually corresponding to the digits 1–10, each of said groups including a wiper and contacts for completing an energizing circuit to a selected one of said indicators of said group, an auxiliary group of contacts having an associated wiper, said wiper of said auxiliary group operating in stepped coincidence with the wiper of the one of said four groups corresponding to the hundreds denominational order, and having its contacts connected respectively to the next lower numerical contacts of said one of said plurality of groups, relay stepping means individual to each group for stepping said wiper of each group to complete said preselected indicator circuits, carry over means comprising a plurality of stepping switches, certain of said stepping switches being connected to the one of said relay means individual to the group of indicators corresponding to the next higher denominational order for selectively completing an energizing circuit for energization of said relay means to advance said wiper of said group controlled by said relay means to complete an energizing circuit for the next higher numerical indicator, and another of said stepping switches being operative at one of its positions to complete an associated relay circuit for switching an energizing circuit from said one of said groups to said auxiliary group.

12. A read out device for indicating in decimal form a numerical value comprising at least four groups of indicators, said groups corresponding respectively to the units, tens, hundreds and thousands denominational orders in a decimal numerical system, said indicators of each group individually corresponding to the digits 1–10, each of said groups including a wiper and contacts for completing an energizing circuit to a selected one of said indicators of said group, an auxiliary group of contacts having an associated wiper, said wiper of said auxiliary group operating in stepped coincidence with the wiper of the one of said four groups corresponding to the hundreds denominational order, and having its contacts connected respectively to the next lower numerical contacts of the said one of said four groups, relay stepping means individual to each group for stepping said wiper of each group to complete said preselected indicator circuits, carry over means comprising a plurality of stepping switches, said stepping switches being associated respectively with said groups of indicators corresponding respectively to the units, tens and hundreds denominational orders, each of said stepping switches having a wiper and ten contact positions, the wiper of each stepping switch operating in stepped coincidence with the wiper of its associated group, the tenth contact of the one of said stepping switches corresponding to the units indicator group being connected to the relay stepping means for the wiper of the tens group of indicators, the tenth contact of the one of said stepping switches corresponding to the hundreds indicator group being connected to the relay stepping means for the wiper of the thousands group of indicators, and the tenth contact of the one of said stepping switches corresponding to the tens indicator group being connected to relay coil for switching an energizing circuit from said hundreds denominational group to said auxiliary group.

13. A read out circuit according to claim 12 being further characterized by an additional relay contact operatively closed by energization of said relay coil and completing an energizing circuit from the ninth contact of the hundreds stepping switch to the relay stepping means for the wiper of the thousands indicator group.

References Cited in the file of this patent

UNITED STATES PATENTS

| 2,678,206 | Muldoon | May 11, 1954 |
|---|---|---|
| 2,727,391 | Kolisch | Dec. 20, 1955 |
| 2,733,911 | Thurston | Feb. 7, 1956 |
| 2,771,596 | Bellamy | Nov. 20, 1956 |
| 2,775,754 | Sink | Dec. 25, 1956 |
| 2,790,549 | Bize | Apr. 30, 1957 |
| 2,812,170 | Kennedy | Nov. 5, 1957 |

OTHER REFERENCES

Electronics, pages 164, 165, November 1953.